United States Patent [19]

Marsh et al.

[11] Patent Number: 5,423,617
[45] Date of Patent: Jun. 13, 1995

[54] SHELF MOUNTABLE PRINTING APPARATUS

[75] Inventors: Michael J. C. Marsh, Johannesburg; Trevor M. Hodson, Randburg; Franz Peschl, Garsfontein; Tricia D. Ritter, Pretoria, all of South Africa

[73] Assignee: CSIR, Pretoria, South Africa

[21] Appl. No.: 234,009

[22] Filed: Apr. 26, 1994

[30] Foreign Application Priority Data

Apr. 27, 1993 [ZA] South Africa .................. 93/2937
Jun. 29, 1993 [ZA] South Africa .................. 93/4650

[51] Int. Cl.⁶ .................................................. B41J 3/36
[52] U.S. Cl. .................................... 400/82; 400/352; 400/357
[58] Field of Search ............. 400/82, 279, 352-355, 400/357, 719

[56] References Cited

U.S. PATENT DOCUMENTS 4,766,295  8/1988  Davis et al. .................. 235/383
5,090,829  2/1992  Lee et al. .................... 400/705.1

FOREIGN PATENT DOCUMENTS

501546   7/1978  Australia ..................... 400/279
242931A1 10/1987  Japan ......................... 400/279

Primary Examiner—David A. Wiecking
Assistant Examiner—Steven S. Kelley
Attorney, Agent, or Firm—Lowe, Price, LeBlanc & Becker

[57] ABSTRACT

The invention relates to a printing apparatus comprising a printing track defining a print receiving surface and a printing carriage arranged to travel along the printing track. The carriage includes printing heads arranged to receive data from a central database for printing on the printing surface at predetermined positions along the printing track, and a roller arrangement for driving the carriage along the printing track. An optical position encoder is provided for monitoring the movement of the carriage as it travels along the printing track. A data transmission link is provided for interfacing the central database to the carriage. The central database includes both positional data for controlling the position of the printing heads and pricing data. The printing track has mounting clips for mounting it on a shelf edge, and the printing heads are arranged to label items of stock on the shelf. The invention extends to the printing track, the printing carriage, a shelf labelling system, as well as to a method of labelling a row of items of stock.

30 Claims, 10 Drawing Sheets

SHELF MOUNTABLE PRINTING APPARATUS

BACKGROUND TO THE INVENTION

THIS invention relates to a printing apparatus, and in particular to a printing apparatus for pricing stock items on supermarket shelves.

Until recently, most items of stock sold in supermarkets were individually labelled with price tags. This involved a shelf packer affixing a price label to each stock item as the items were being placed on the shelves during re-stocking. More recently, a bar coding system has been introduced, in which packaging for a particular item range has a bar code printed thereon identifying the particular item range. A scanner at the check-out counter scans the bar code and a computer to which the scanner is linked positively identifies the item and extracts the price of the item from an on-board memory table.

With the introduction of bar codes, the prices of stock items need to be indicated in a discernible format. The current practice is to provide labels which are held within labelling holders attached to the shelf on which the items are standing. This gives rise to logistic difficulties, as the shelf prices have to be kept identical to the prices on the computer in the face of price changes occurring on a daily basis. The manual replacement of pricing labels is a particularly time consuming and labour intensive process.

SUMMARY OF THE INVENTION

According to a first aspect of the invention there is provided a printing apparatus comprising an elongate printing track including a print receiving surface being integral with and fixed relative to the printing track, guide means extending alongside the print receiving surface, a printing carriage arranged to travel along the printing track on the guide means, monitoring means for monitoring the movement of the carriage as it travels along the printing track, and control means responsive to the monitoring means for controlling the operation of the carriage, the carriage including at least one printing head arranged to receive data for printing directly on the print receiving surface at predetermined positions along the printing track.

In a preferred form of the invention, the printing apparatus includes a central database remote from the carriage, the carriage includes memory means, and data transmission means are provided for allowing data to be downloaded from the central database to the memory means on the carriage, the central database including both positional data for controlling the position of the printing head on the printing track and labelling data for printing labelling on the print receiving surface of the printing track.

In one form of the invention, the printing track includes mounting means for mounting the printing track on a shelf edge, and the printing carriage is arranged to label items of stock on the shelf.

Alternatively, the printing track is formed integrally with a shelf, towards an overhanging edge thereof.

The printing apparatus may include a fixed feed track arranged to provide mounting means for the carriage prior to printing on the printing track, the printing track arranged to be mounted detachably adjacent and in axial alignment with the fixed feed track.

In one form of the invention, the carriage includes drive means arranged to co-operate with the guide means for driving the carriage along the printing track.

Alternatively, the carriage may be arranged to be manually scanned along the printing track.

The monitoring means is typically synchronized with the control means for controlling the operation of the printing head, the monitoring means being arranged to provide timing signals based on the movement of the printing head on the print receiving surface.

The monitoring means may include identification means located on the printing track, and a reader provided on the carriage for reading the identification means, the reader being arranged to interact with the identification means to control the downloading of data onto the printing track at predetermined positions on the track.

The guide means preferably includes at least one rail formation, and the carriage includes at least one roller arrangement for co-operating with the rail formation for travelling along the printing track.

In particular, the guide means may include a pair of opposed rail formations flanking the print receiving surface, and the roller arrangement includes at least one pair of rollers arranged to travel along and to be held in captive engagement with the rail formations.

In a preferred form of the invention, the control means includes a central processing unit, static memory means for storing relatively static data, and volatile memory means for storing relatively dynamic data.

The static data may include icon-related data providing icons or images of stock, and/or font-related data, and/or translation data.

The dynamic data preferably comprises shelf description data including positional data for controlling the position of stock labels and pricing data reflecting updated prices of stock.

The monitoring means typically includes an optical position encoder arranged to be coupled to a roller arrangement carried on the carriage, logic circuitry responsive to the optical position encoder, and a printer driver controlled by the logic circuitry, the printer driver being arranged to drive the printing head.

The central database may include identification data for identifying which printing track on a particular shelf or gondola requires printing.

The identification means may be located on at least one end of the printing track, the identification means being arranged to identify a particular printing track to ensure that the correct data is printed on the track.

The invention extends to an elongate printing track assembly comprising a print receiving surface being integral with and fixed relative to a printing track, guide means extending alongside the print receiving surface for accommodating a printing carriage, the printing surface being arranged to receive print directly from a printing head extending from the carriage, and being formed from a material upon which a printing ink is receivable, curable and erasable.

The printing track assembly preferably includes mounting means in the form of a plurality of clips for mounting the printing track detachably to the shelf edge, and complemental clip-engaging formations carried on the printing track, each clip comprising a clamping bracket for clamping the clip detachably to a shelf edge, and a pair of jaws extending from the clamping bracket and arranged to engage the clip-engaging formations in a snap fit.

Each clip conveniently comprises height adjustment means for adjusting the height of the printing track relative to the shelf edge.

The material from which printing surface is formed is typically chosen from a group including Melamine ®, PVC or an acrylic plastics material.

The printing ink is typically chosen from a group including water- or solvent-based resin bonding agents.

According to a further aspect of the invention there is provided a printing carriage arranged to travel along a plurality of separate elongate printing tracks, each printing track defining a print receiving surface integral with and fixed relative to the track, the carriage including roller means for travelling along guide means on the printing track, monitoring means for monitoring movement of the carriage as it travels along the printing track, control means responsive to the monitoring means for controlling the operation of the carriage, memory means and at least one printing head arranged to receive data at the memory means via data transmission means for printing directly on the printing surface at predetermined positions along the printing track.

The printing carriage may include drive means for driving the carriage along the printing track via interaction of the roller means and the guide means.

According to a still further aspect of the invention there is provided a shelf labelling system for identifying and pricing items of stock on shelves, the labelling system comprising a plurality of printing tracks extending along the lengths of the shelves and including print receiving surfaces on each track, at least one printing carriage being arranged to travel along the printing tracks and having a printing head, a central database, and data transmission means for allowing the central database to download at least stock pricing data to the carriage, the printing head being arranged to receive the data for printing on the print receiving surfaces at predetermined positions along the printing tracks.

The invention extends to a method of labelling a first row of items comprising the steps of:
a) providing labelling data relating to the items;
b) locating a printing carriage at a predetermined position on a first continuous printing track extending alongside the first row of items;
c) transferring the data to the printing carriage; and
d) printing the data on a printing surface of the printing track at positions determined by the location of the items as the printing carriage moves along the printing track.

Typically, the method includes the initial steps of entering, at a remote database, updated data relating to the items, and transferring the updated data to the printing carriage.

The method preferably includes the steps of removing the printing carriage from the first printing track, locating the printing carriage on a second printing track extending alongside a second row of items, and repeating the steps of transferring the data to the printing carriage and printing the data on a printing surface of the printing track in positions determined by the location of the items as the printing carriage moves along the printing track.

Conveniently, the method includes the steps of identifying the row of items to be labelled, and confirming that the labelling data corresponds to that row.

The labelling data may include pricing data, positional data, and item identification data.

BRIEF DESCRIPTION OF THE DRAWINGS

FIG. 8 shows a more detailed functional block diagram of the printing apparatus of FIG. 7;

DESCRIPTION OF EMBODIMENTS

Figure 1:
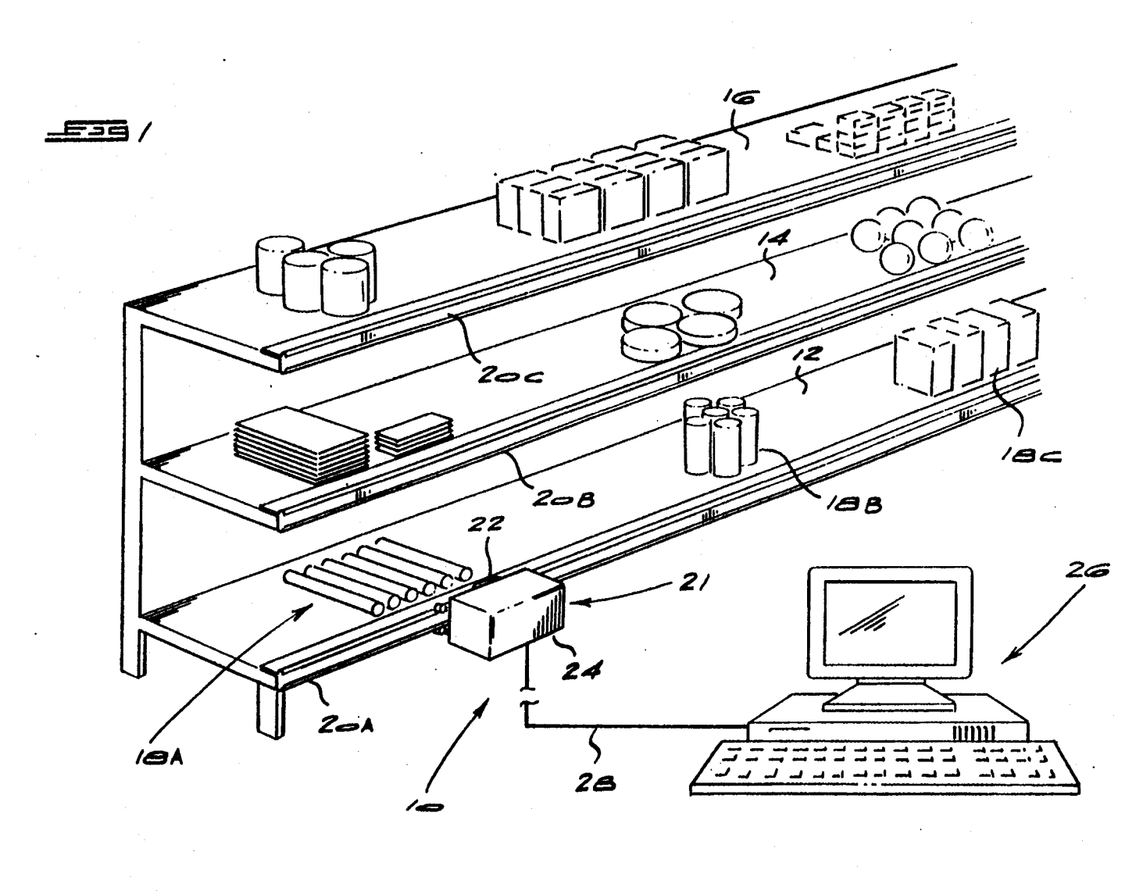
FIG. 1 shows a highly schematic view of a first embodiment of a printing apparatus of the invention in operation.

Referring to FIG. 1, a printing apparatus 10 is shown in operation on a tier of supermarket shelving, which comprises three shelves, 12, 14 and 16. Items of stock 18A, 18B and 18C are arranged in groups on the shelves. Printing tracks 20A, 20B and 20C are fitted to the outer edges of each of the respective shelves 12, 14 and 16. A printing carriage 21 comprises a printing head 22 enclosed within a housing 24, and is arranged to travel along the printing tracks 20A, 20B and 20C. The carriage 21 is connected to a central computer 26 via a data transfer cable 28. The computer 26 includes a database containing identification data relating to each of the items of stock, the price of each item, as well as the position of the items on the shelves. The central computer 26 is also linked to the bar code readers and electronic tills at each of the check-out counters.

Figure 2:
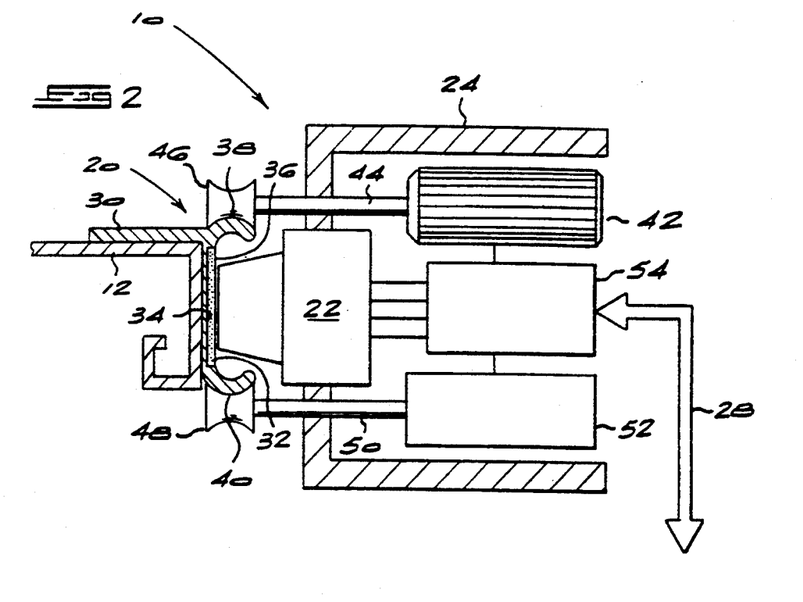
FIG. 2 shows a more detailed partly schematic view of the printing apparatus of FIG. 1.

Referring now to FIG. 2, a more detailed view of a printing apparatus 10 is shown. The printing track 20 is extruded from a metal such as aluminium, and has a rearwardly extending support flange 30 which is fixed to the upper surface of the supermarket shelf 12 by glue, rivets or the like.

A plastics insert 32 is mounted fixedly within a recess 34 in the aluminium extrusion, and has an exposed print receiving surface 36 arranged to receive printing ink from the printing head 22. The plastics insert 32 is flanked by a pair of upper and lower arcuate channel or rail formations 38 and 40.

The printing head 22 may include a drop-on-demand or bubble jet ink jet printer capable of spraying ink dots onto the plastics insert 32. The printer typically includes a full colour vertical arrangement of sources. Alternatively, a single vertically scannable source can be provided. The housing 24 houses a stepper motor 42 from which a drive shaft 44 extends. A bi-concave rubber drive roller 46 is attached to the end of the drive shaft 44, and fits snugly over the outer surface of the upper channel formation 38. The stepper motor is powered via the cable 28.

A similar bi-concave rubber idler roller 48 is carried on the end of the shaft 50 which extends from a movement monitor 52. The rubber rollers 46 and 48 combine to engage frictionally the outer convex surfaces of the respective channel formations 38 and 40. It is clear how rotation of the rubber drive roller 46 will cause the carriage to move to and fro along the printing track 20. The printing head 22, the motor 42 and the movement monitor 52 are coupled to control circuitry 54 which is in turn interfaced to the central computer 26 -via the interface cable 28. The control circuitry may include an on-board memory module for storing data downloaded via the cable 28.

The priming apparatus of the invention is used in the evenings or early in the morning, when the supermarket is empty. All the old markings are first wiped off the printing surface 36 of particular printing track using a suitable solvent-based cleaning fluid such as an alcohol- or ammonia-based product.

Relevant data is transferred from the central computer 26 to the control circuitry 54. The carriage is then attached to the printing track 20A at the end of the first shelf 12 which requires pricing. A keypad and a display may be provided on the carriage. The keypad may include a calibration key for ensuring that the printing head has been correctly calibrated for each shelf. A suitable reference marking may also be provided at one end of the track 20A for ensuring that the carriage is in the correct position on commencement of a printing cycle. A display panel may be used to indicate which shelf has been programmed, as well as providing an indication of the data that is being printed onto the plastics insert 32. The drive roller 46 is arranged to move the carriage at a speed of approximately half a meter per second.

Figure 3:
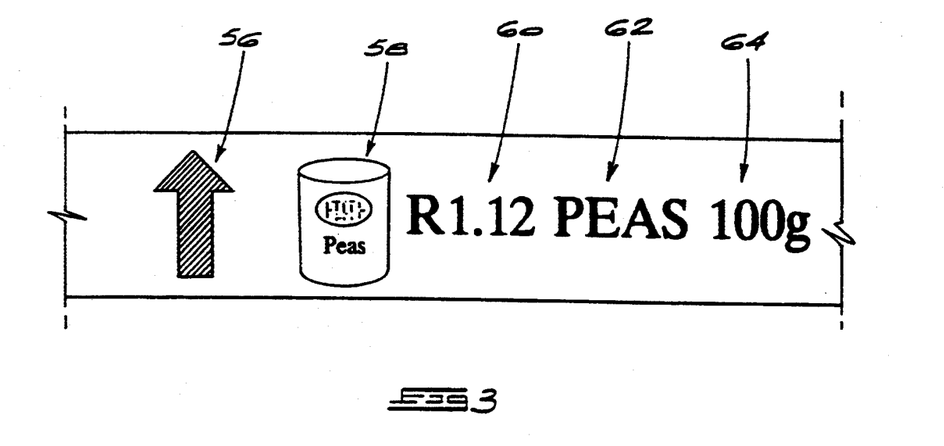
FIG. 3 shows a typical sample of data printed by the printing apparatus for one stock item.

Referring now to FIG. 3, a typical sample of what is printed on the printing surface of the plastics insert 32 includes an arrow 56 indicating the position of the items of stock. The arrow 56 is followed by an icon or logo- type 58 providing a pictorial indication of a stock item, in this case a can of peas. The logotype 58 is followed by a price 60, lettering 62 and a mass indication 64.

The movement monitor 52 provides a feedback signal to the control circuitry 54 for indicating exactly when information relating to the next stock item should be printed. The movement monitor also indicates when the carriage is jammed or obstructed. Once the carriage reaches the end of the shelf 12, it is simply removed and located over the printing track 20B at either end of the next shelf 14 for commencement of a further printing cycle. All of the shelving in the supermarket is labelled in a predetermined sequence in this manner.

The central computer may be provided with a graphical display for allowing the store manager to place and to indicate the placement of items on his screen in order for the price label to be printed on the correct part of the shelf. This computer may be a lap top computer which is carried around as pricing takes place. Alternatively, the central computer may be housed in the administration offices, and each shelf may be provided with fixed wiring into which the carriage is plugged when a particular shelf is being priced. The previously mentioned memory module may have sufficient capacity to store data for one or more shelves. In this case, the data cable may be unplugged and the motor may be battery powered.

Most stock in supermarkets is stored on shelves or gondolas, which may typically be forty or more meters long, and which are ideally suited for receiving elongate printing tracks of the type illustrated and described above.

Figures 4, 5:
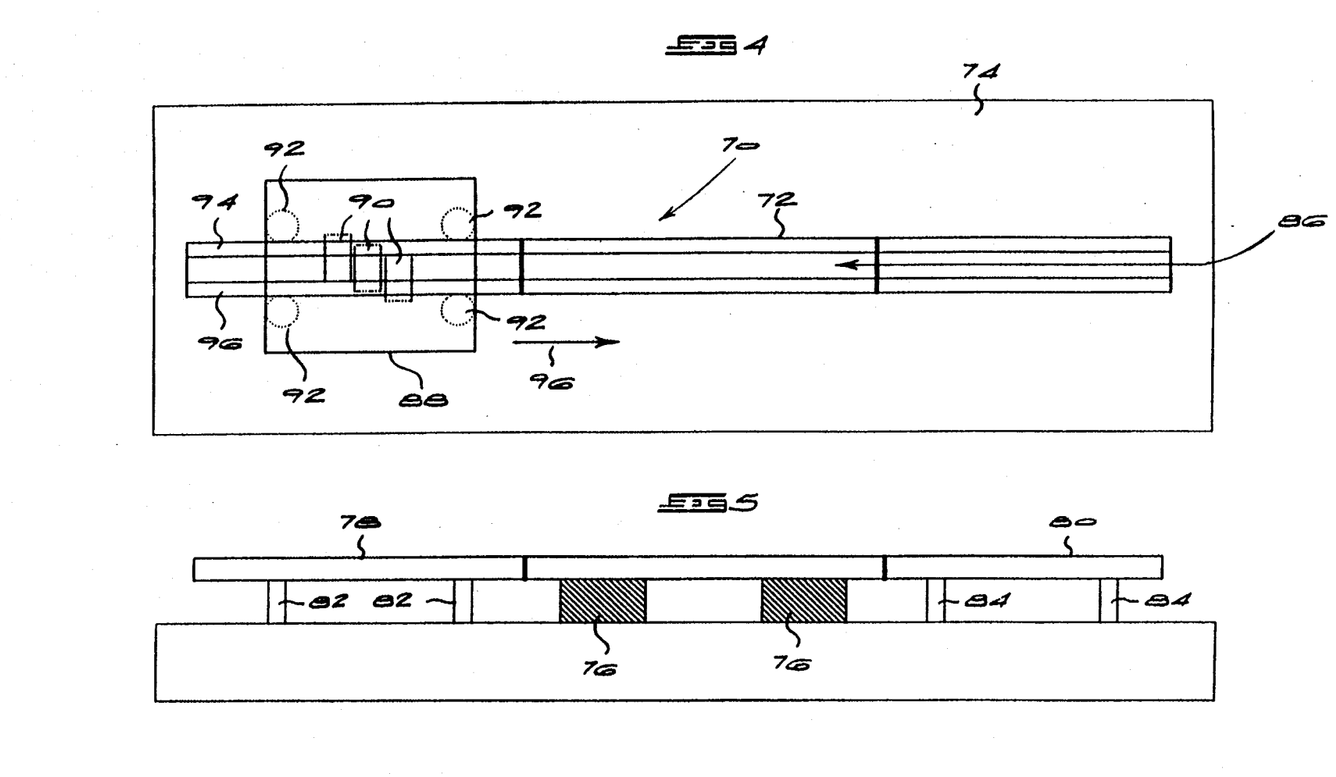
FIG. 4 shows a schematic side view of a second embodiment of a printing apparatus of the invention incorporating a track assembly and a multiple head carriage.
FIG. 5 shows a top plan view of the track assembly of FIG. 4.

At other locations in a supermarket or warehouse, such as alongside check-out counters, relatively short printing tracks having a length of one meter or less are required. In FIGS. 4 and 5, a track assembly 70 is shown comprising a central removable track 72 mounted onto a fixed base 74 by means of a pair of detachable connectors 76. The central removable track 72, which is approximately one meter long, is flanked by a pair of similar fixed tracks 78 and 80 which are permanently mounted to the fixed base 4 on pairs of connectors 82 and 84. It is clear from FIGS. 4 and 5 how the central track 72 is positioned in axial alignment with the fixed tracks 78 and 80, thereby defining a continuous and uninterrupted printing surface 86.

A printing carriage 88 supports an array of off-set printing heads 90, which are arranged to print across the entire width of the printing surface 86. Four rollers 92 engage opposed upper and lower rails 94 and 96, and allow the carriage 88 to travel to and fro along the track assembly 70. With the multiple print head arrangement illustrated in FIG. 4, it is clear that if the carriage 88 is only permitted to run on the central track 72, then significant dead space will result at opposite ends of the track 72. The flanking tracks 78 and 80 allow for both pre- and post-positioning of the carriage 88 so as to ensure that the central track 72 is printed along the entire length of its printing surface.

Once suitable pricing and goods identification information has been printed onto the central track 72, it is removed and mounted in position on an appropriate basket or short length of shelving adjacent a check-out counter or the like.

The central track 72 is then replaced with a fresh track, the printing carriage 88 is mounted on the fixed track 78 in the position indicated in FIG. 4, and is either moved manually or driven along the track assembly in the direction of arrow 96 to a final position on the fixed track 80 once new data has been downloaded into the printing carriage. The base 74 may be in the form of a wall or another appropriate fixture which may, for instance, be located in the manager's office alongside the central computer in which all the pricing information is stored.

Figure 6:
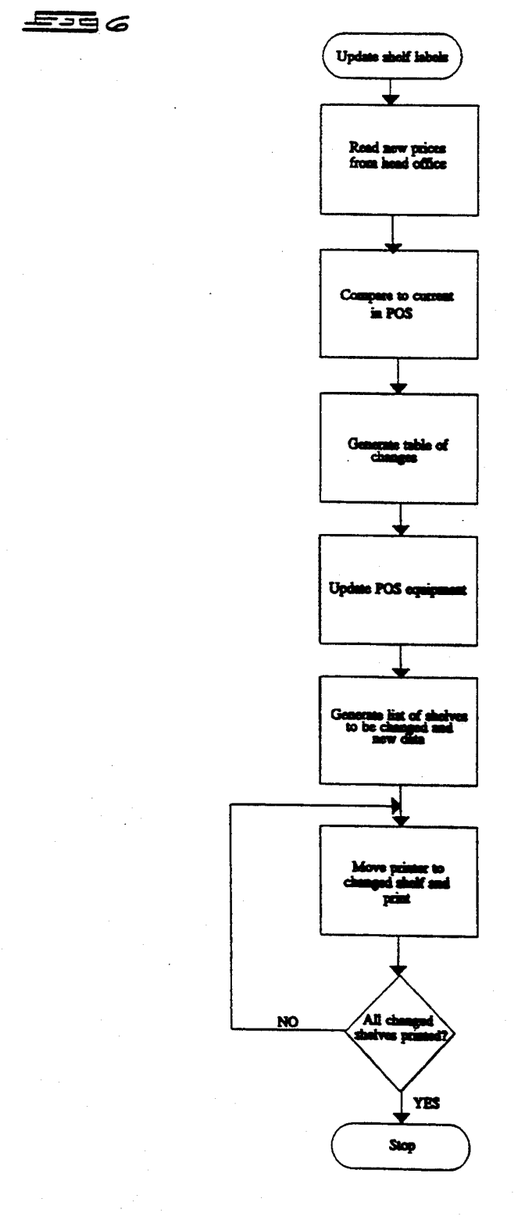
FIG. 6 shows a flow chart illustrating a typical shelf printing routine.

Referring now to FIG. 6, a flowchart is shown indicating how shelves in a supermarket can be updated without the staff needing to know which individual items have changed price. If only one label needs to be changed on a gondola, in view of the shelf edge printing or labelling extending for the entire length of the gondola, it is not necessary to identify which specific item will change, as long as the correct shelf on the gondola is relabelled.

During inactive periods, such as at night, the computer system in the store receives a list of new prices from the head office, which are to be charged the following day. These are compared against the current price being charged at the point of sales terminals, as well as the price which is currently printed on the shelf tracks. Arising out of this comparison, a table of changes is then generated which is used to update the point of sale equipment. A map setting out the location of all the items in the supermarket is stored in the computer, which is then able to generate a list of gondola and shelf numbers that need to be changed to reflect new prices and other data. A shelf and gondola list is generated, and each shelf and gondola is then deleted from the list as the changes are implemented. In order for a change to be implemented, the operator must physically convey the printer to the particular gondola and shelf and reprint the shelf edge, allowing the computer or alternatively an on-based printer memory bank to download the updated image over the entire length of the shelf edge label track. The location of that particular shelf or gondola is then removed from the list. The process is repeated until all the necessary changes have been made to all the shelves and gondolas.

A further variation on the process described above is to identify each gondola and shelf with a bar code which is attached at the beginning of each printing track. By incorporating a bar code reader on the printing carriage, the bar code is scanned, providing an indication of which gondola shelf number is currently being printed, and allowing the labelling information for that particular shelf to be retrieved from the central computer and downloaded from the printing carriage. A relatively low-skilled operator may be used to perform this job, as it is not possible to print labelling information on the wrong shelf owing to the bar code identification facility.

Figure 7:
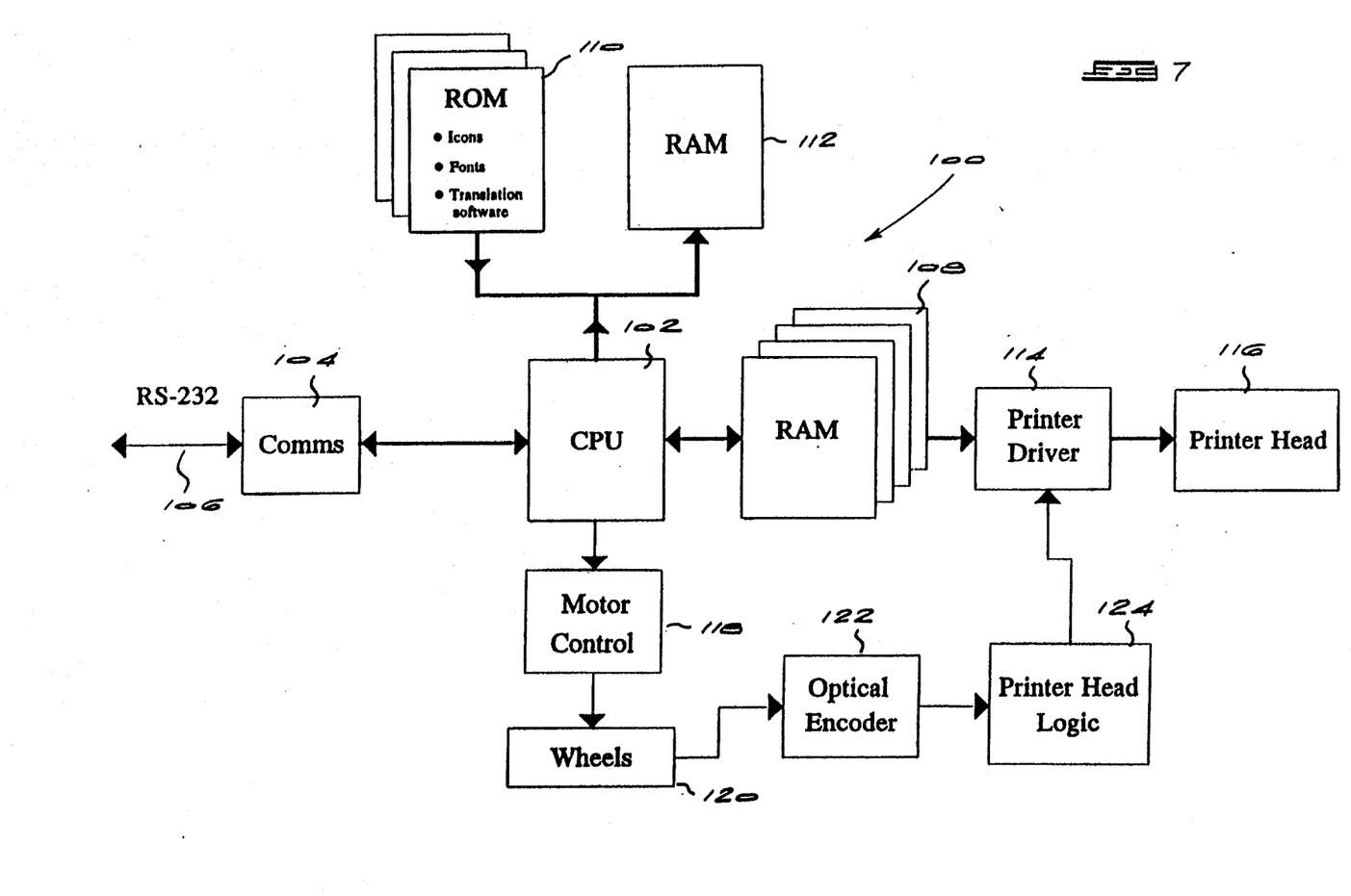
FIG. 7 shows a functional block diagram of the first embodiment of the printing apparatus of the invention.

Referring now to FIG. 7, a functional block diagram of a typical printer or printing carriage 100 is shown. A central processing unit 102 is linked to a central computer via a communication interface module 104 coupled to a relatively low speed RS232-type link. Instructions describing the shelf, together with updated pricing information, are passed to a 13 Megabyte buffer memory 108 via the RS232 link in a suitably compact format. Typically, a printer shelf is described in 10000 characters, which includes general positioning information, the directions of arrows, the text font, size and content to be incorporated, the reference system of icons or images to be used, as well as other general labelling information.

The printer has an on-board ROM memory bank 110 which has stored within it icons representative of the various stock items, printing fonts which are to be used, and translation software. More dynamic information, such as the prices of articles, are written into a RAM memory bank 112.

The CPU 102 extracts the relevant ROM data and the RAM pricing data, combines this with the updated pricing data and shelf description data received from the main computer via the RS232 port, and downloads this into the buffer memory 108. This information is in turn downloaded via printer driver circuitry 114 to a printing head 116. The central processing unit 102 is also linked to motor control circuitry 118 which controls the operation of a motor for driving at least one wheel or roller 120 of the carriage.

An optical position encoder 122 in the form of a slotted disc is used to monitor the rotation of one of the roller wheels on the track, and can be used to detect movements of distances as small as 0.01 millimeters. The optical position encoder 122 is coupled to printer head logic circuitry 124 which is used to generate a suitable pulse every 0.01 millimeters. This is in turn used to drive the electronics in the printer driver circuitry 114 for printing one column of image. As a result, the quality of the print is not related to the speed and consistency of the movement of the printing carriage down the track, as dots are only printed every fixed distance moved. Consequently, it is not essential that the carriage be driven by a motor. A manual system which is pushed or pulled along this track may be used in conjunction with the monitoring circuitry described above, without the need to implement relatively complex motor drive circuitry. As the movement monitoring circuitry incorporates the optical position encoder 122 and the printer head logic circuitry 124, an even and continuous image may be printed regardless of any intermittent or jerky movement of the carriage.

A suitable ink, such as a water- or solvent-based diluted resin bonding agent, is provided for this application. The ink is very quick drying as it is printed vertically, and does not run down the printing surface while drying.

In order to assist in drying, the ink may be an ultraviolet sensitive ink, and the printer may incorporate an ultra-violet light for allowing the ink to cure almost instantaneously after it has been deposited on the printing surface. The printing surface may be in the form of a glossy Melamine ® surface, from which the ink may be removed by means of a solvent such as alcohol or thinners. A pad soaked in a suitable alcohol- or ammonia-based solvent may be mounted on the carriage ahead of the printing head 116 in order to delete previous pricing information. Alternatively, a separate cleaning carriage may be provided, to which cleaning pads or brushes are mounted.

As the printer 100 is able to print a free field for the entire length of the printing track, suitable advertisements, marketing slogans and "specials" information may be printed at those locations where there is a significant space between product labels. Labels may be printed in different sizes on different shelves to cater for near- or far-sighted customers, and to allow for variation in viewing distances.

Referring now to FIG. 8, a detailed functional block diagram of a more sophisticated embodiment of a printing apparatus is shown. Components which are similar or identical to the previously described components have been indicated with identical numerals. A printing carriage 126 is powered via a power supply line 128 which is connected to a power supply circuit 130. The power supply circuit 130 includes a chargeable battery pack 132 which is arranged to maintain the contents of a 32 megabyte dynamic RAM (DRAM) memory bank 134 via a signal conditioning circuit 136 in the event of the power supply line being unplugged.

The RS232-type link linking the CPU 102 to the central computer 26 via the communication interface module 104 is used in two modes. The first mode is the off-line state, in which the printing carriage 126 is not being used to print on the shelves. The printing carriage is placed next to the central computer 26 and is connected to the central computer via a relatively short RS232 link which allows a higher data transmission rate. In this off-line mode, the central computer 26 can relatively rapidly update the icons, images and text fonts which are stored in the DRAM memory bank 134 of the printer CPU 102.

The second mode is the on-line state, in which the printer is involved in printing on the shelf edges in the store. Due to the length of the cable for the RS232 link connecting the central computer 26 to the printing carriage 126, the data transmission rate is relatively low. As was mentioned previously, a shelf is typically described in 10 000 characters.

Consequently, when the printer is printing on a shelf edge in the store, only the description of the particular shelf is conveyed on-line from the central computer 26, and the icons, images and text fonts are downloaded from the DRAM memory bank 134. It is also possible to have the shelf description downloaded and stored in the on-board CPU 102, with the result that the printing carriage can operate off-line, with no RS232 link being provided during a printing operation. Off-line operation requires the printer to be connected to the central computer 26 after it has finished printing all the shelves as a double check to ensure that all the shelves have been reprinted correctly. In the particular embodiment being described, the printer 126 is connected to the central computer 26 via the RS232 link whilst it is printing on the shelves.

A user interface 138 is connected to the CPU 102, and includes a four-key keypad 140, a sixteen character LCD alphanumeric display 142, red and green LED's 144 and 146 and an on/off switch 148. The alphanumeric display 142 is used to inform the operator of the printer of the status thereof and the shelf numbers to be printed and in addition displays, calibration information for the printer heads and indicates any problems that may be encountered.

The keypad 140 includes "left" and "right" keys 150 and 152 and "yes" and "no" keys 154 and 156. The "left" and "right" keys are used to indicate to the printer on which edge of the shelf the printer is commencing printing in the event of a barcode scanner not being used. The "yes" and "no" keys 154 and 156 are used for shelf selection in response to the menu-driven display 142 in the event of no barcode scanner being used, and are also used to commence a printing operation. The green LED 144 indicates that power has been applied and that operation is normal, while the red LED 146 indicates that a fault condition has arisen.

The previously mentioned barcode reader comprises a wand 158 which is coupled to the CPU 102 via an interface circuit 160 which controls the operation of the wand and decodes the barcode once it has been read from the wand. The interface circuit 160 incorporates a loudspeaker 162 which is used to indicate to the operator when a valid barcode has been read. The barcode reader is used to scan the barcode representative of a shelf number at the end of each shelf, as well as to ascertain from the barcode whether the printing carriage has been placed at the left or right end of a particular shelf. A barcode reader of this type may also be used in the previously described simpler version of the printing apparatus of the invention in which barcodes are provided at intervals along the printing track as printing prompts, thereby avoiding the need for accurate position monitoring equipment and the downloading of positional data via the central computer.

Further sensors on the printer 126 include the displacement sensor, or the previously described optical position encoder 122, which is coupled to the CPU 102 via the signal conditioning circuitry 136, and is coupled directly to one of the wheels 120 of the printer.

Right and left optical edge detectors 164 and 166 alert the CPU 102 that the printer is about to move off the edge of a shelf either to the right or to the left respectively, thereby allowing the printer to stop the motor prior to the printer falling off the shelf.

The optical edge detectors 164 and 166 can also be used by the CPU to position the printer 126 accurately at the edge of a shelf prior to printing. For example, if the printer is placed on the left hand side of a shelf, then before it starts printing to the right, it can slowly move itself to the left by means of a motor until the left optical edge detector 166 alerts the CPU 102 that the printer has reached the left edge. In this manner, the printer 126 can automatically use the edge of the shelf as a reference or datum point for the purposes of printing on the shelf, as an alternative to the operator having to align the printer manually to a reference mark prior to printing.

Figure 9:
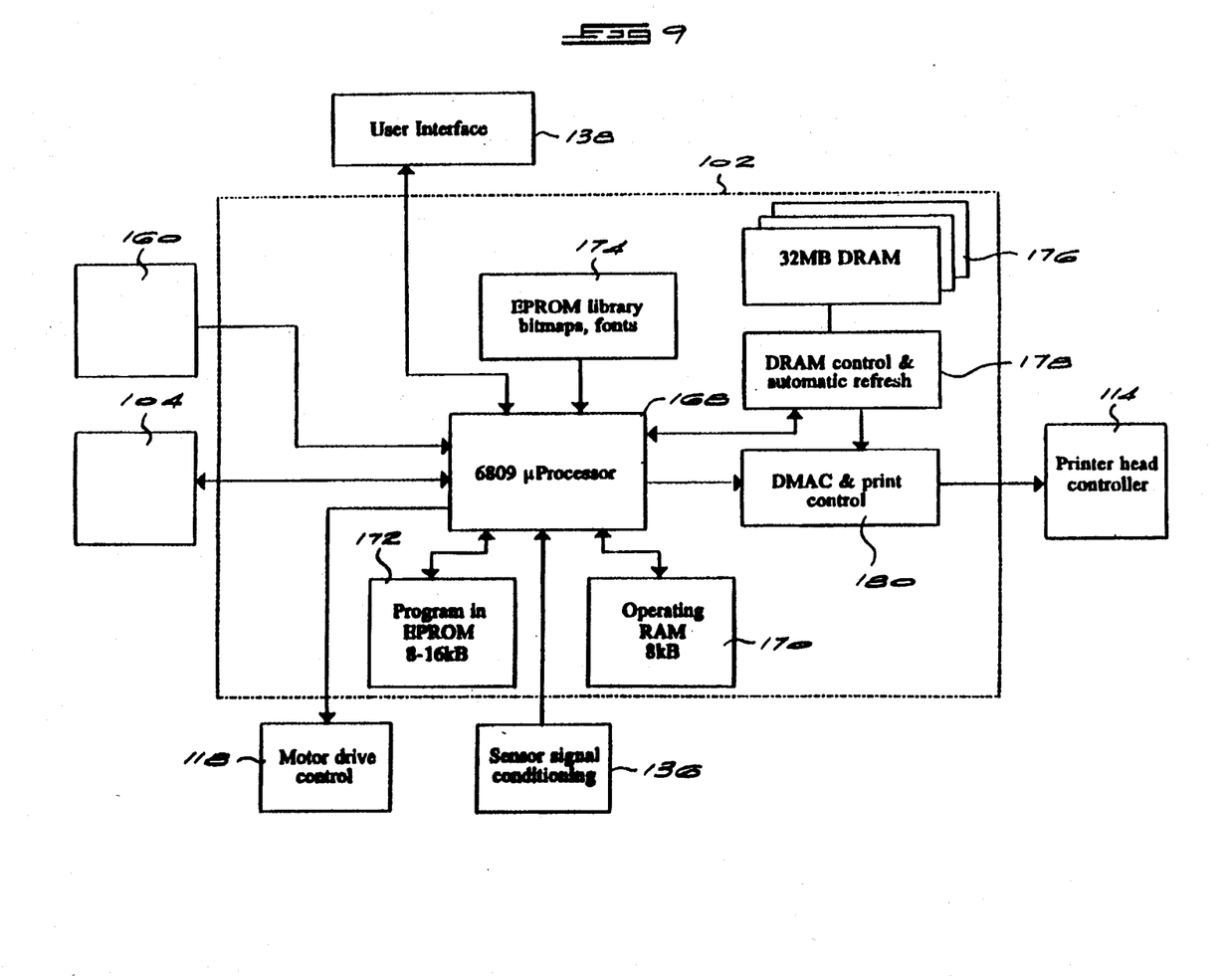
FIG. 9 shows a detailed block diagram of the on-board control circuitry of the printing apparatus of FIG. 8.

Referring now to FIG. 9, a more detailed block diagram of the CPU 102 is shown. The CPU 102 is driven by a 6809 microprocessor 168 and its associated 8 kilobytes of operating RAM 170 and 8 to 16 kilobytes of EPROM 172 incorporating software executed by the microprocessor 168.

The main memory bank comprises two blocks or modules, namely an EPROM block 174 which is expandable up to 32 megabytes and a 32 megabyte dynamic RAM (DRAM) block 176. The DRAM block 176 is coupled to the microprocessor 168 via a DRAM control and automatic refresh circuit 178 which allows the microprocessor to access the full 32 megabytes of RAM and also to automatically refresh the DRAM memory to ensure that the data is maintained in the DRAMs.

The DRAM block is used for the storage of downloaded icons, images and text fonts. The contents of the DRAM block are maintained by the battery 132 in the power supply when the printer 126 is not connected to a power source. During the "off-line" periods, the central computer 26 updates the icons, images and text fonts stored in the DRAM block 176 via the RS232 serial link.

The EPROM block 174 contains libraries of standard icons, images—such as scanned photographs—and text fonts which are most commonly used during the printing operation. The EPROM block may be in the form of a module or card which may be periodically upgraded.

The DRAM memory block 176 is also used as a temporary buffer when the shelf is being printed, in that the entire image of a particular shelf is assembled in the DRAM block prior to commencing of the shelf printing operations. The image of the shelf is made up from the description of the shelf that is downloaded from the central computer 26. The CPU 102 utilises the description by extracting the icons, images and text fonts from the DRAM block and copying them into the correct position in the temporary buffer which also forms part of the DRAM block. The image of the shelf in the temporary buffer is arranged in a series of vertical print slices or blocks of data for every 0.01 mm of the shelf space, the 0.01 mm corresponding to the pulses received from the optical encoder 122.

Once the image of the shelf has been generated, the DMAC and print control circuit 180 transfers the image to the print head controller 114. A transfer of the image commences at the start of the temporary buffer in the DRAM block, if the printer starts at the left hand end of the shelf and at the end of the temporary buffer if the printer starts at the right hand end of the shelf. The rate of transfer of the image to the print head controller is controlled by the optical position encoder 122 via the signal conditioning circuit 136 and the CPU 102.

Every time the printer moves a further 0.01 mm, a new block of data covering the next print "slice" is transferred to the printer head controller to be printed.

Figure 10:
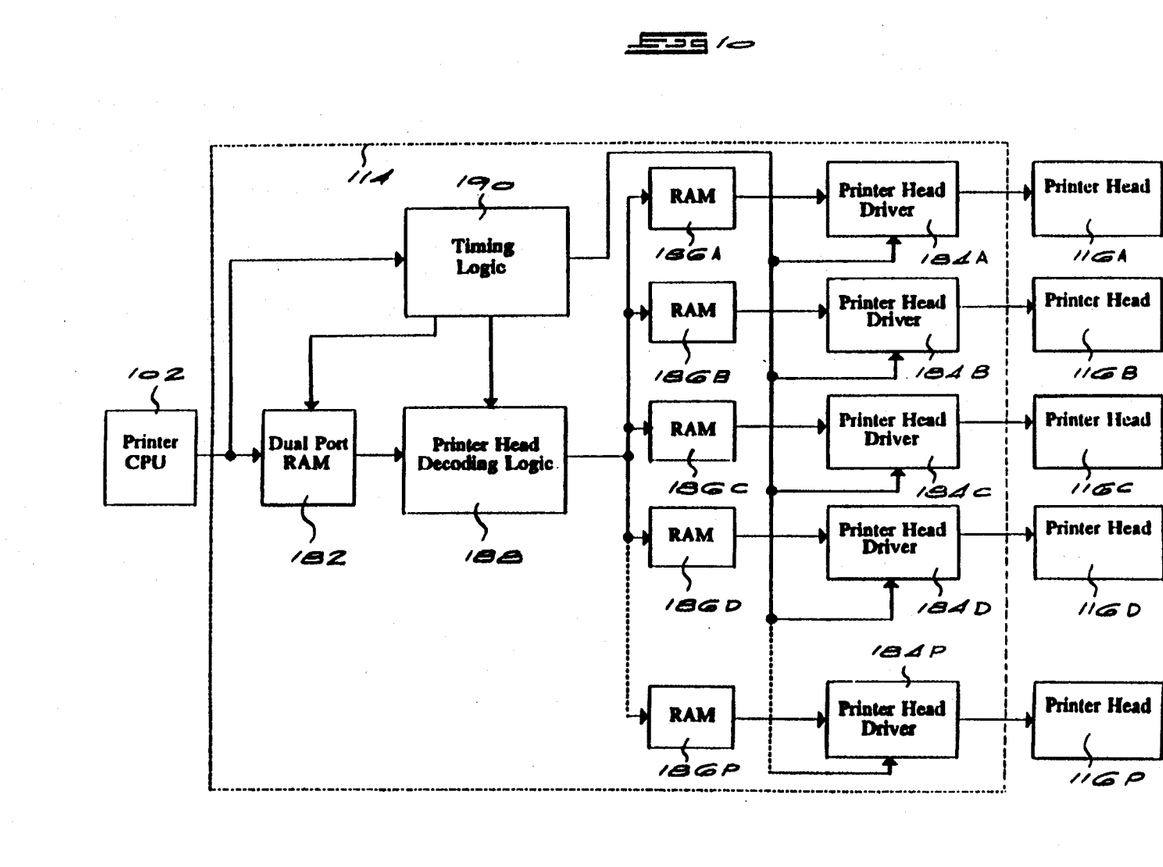
FIG. 10 shows a detailed block diagram of control circuitry for the printer head.

In FIG. 10, a detailed block diagram of the printer head controller 114 is shown. The printer head controller interfaces with the CPU 102 of the printer via a dual port RAM 182. This allows a new block or slice of image data to be written into the dual port RAM while the old image data is being printed. The printer head controller 114 derives its timing from the pulses received from the optical position encoder 122 via the signal conditioning circuit 136 and the printer CPU 102.

In a single colour version of the printer there are four printer heads 116A to 116D which are arranged to cover the width of the printing surface. In the case of a full colour printer, sixteen separate printer heads 116A to 116P are required, comprising four heads for each of the basic colours of cyan, magenta, yellow and black. Each set of four printer heads is arranged vertically to cover the width of the printing surface, with the result that a colour printer includes a four-by-four matrix of sixteen printer heads.

Each printer head 116A to 116P, is provided with an associated relatively small portion of RAM 186A to 186P, which serves as temporary storage means for storing the image to be printed by a particular printer head. The data in each printer head RAM 186A to 186P are transferred from the dual port RAM 182 via printer head decoding logic circuitry 188, which divides up the image data received from the dual port RAM so that part of the image to be printed by the printer head 116A is transferred to the RAM portion 186A associated with that printer head. The remaining parts of the image are similarly transferred to the RAM portions 186B to 186P.

A timing logic circuit 190 controls the printing of each printer head 116A to 116P, as well as the transfer of data from the dual port RAM 182 to the portions of printer head RAM 186A to 186P. The printing process commences once a print pulse is received. The data in a particular printer head RAM 186A are printed onto the shelf via the associated printer head driver 184A and the printer head 116A. Once printing is finished, the next image data to be printed are transferred via the decoding logic to the respective printer head RAMs.

While this transfer is occurring, the next "slice" of image data is transferred into the dual port RAM 182 from the printer CPU 102. The process is re-iterated when the next printing pulse is received. In this manner, ordered "slices" of image data are printed vertically onto the shelf edge surface each time the printer moves a further 0.01 mm.

Figure 11:
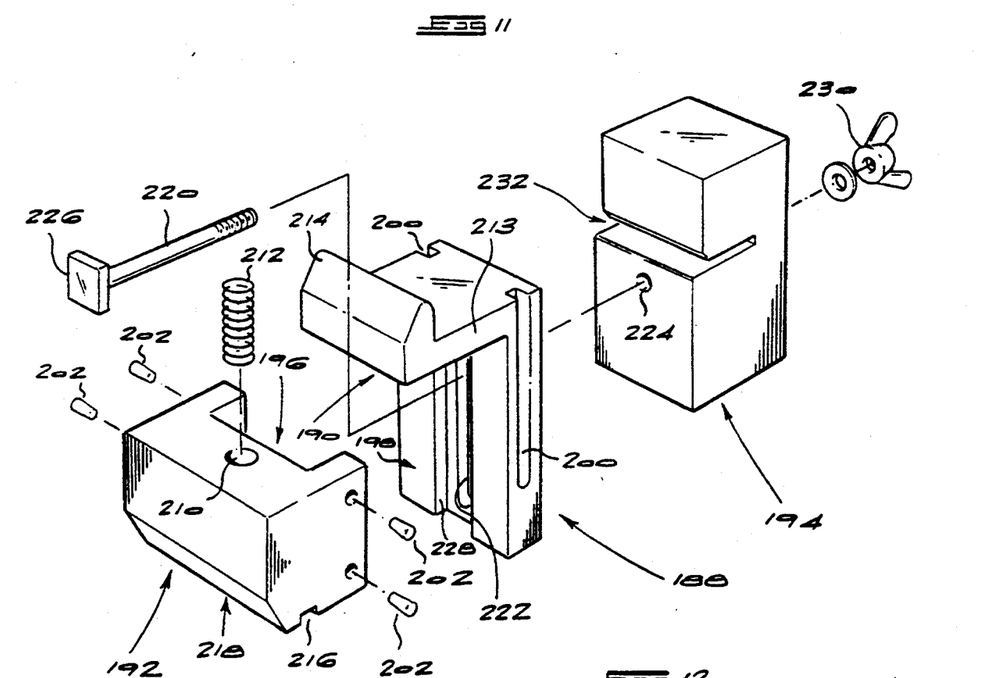
FIG. 11 shows an exploded perspective view of a clip arrangement for mounting a printing track detachably to a shelf edge.
Figure 13:
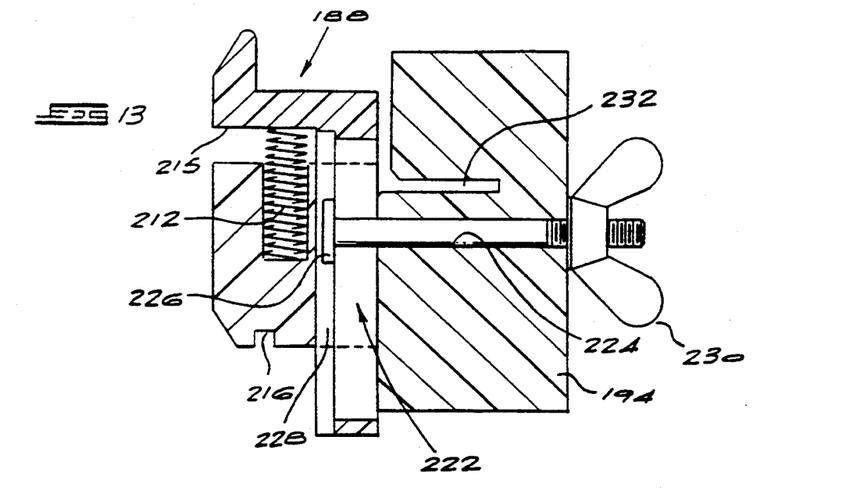
FIG. 13 shows a cross-sectional side view on the line 13—13 of FIG. 12.

Referring now to FIG. 11, an exploded view of a clip arrangement 188 is shown for clipping a printing track detachably to a shelf edge. The clip arrangement includes an upper jaw formation 190, a lower jaw formation 192 and a clamping block 194. The lower jaw formation 192 has a rear rectangular recess 196 which forms a complemental sliding fit with an upstanding limb 198 of the upper jaw. A pair of blind slots 200 are formed in opposite side faces of the upper jaw 190, and pairs of opposed pins 202 protrude into the rectangular recess 196 and are arranged to slide up and down within the slots 200, thereby holding the lower jaw 192 captive. A blind bore 210 extends into an upper surface of the lower jaw, and accommodates a coil spring 212. Extending from the vertical limb 198 of the upper jaw is a horizontal limb 213, which terminates in a foot 214. The spring 212 abuts against an overhanging surface 215 of the limb 213, which can be seen more clearly in FIG. 13. A groove 216 is formed in a lowermost face of the lower jaw, and defines a lower foot 218.

A bolt 220 is passed through a central vertical slot 222 formed in the limb 198 and a round cylindrical aperture 224 extending through the clamping block 194. The bolt 220 has a flattened square head 226 which is accommodated within a stepped recess 228 formed adjacent the groove 222. A butterfly nut 230 is screwed over the threaded shaft of the bolt 220, thereby tightening up the clamping block 194 against the upstanding limb of the upper jaw 190. The upper jaw 190 may be slidably adjusted relative to the mounting block merely by loosening the butterfly nut 230 and allowing the lower jaw 190 to slide up and down relative to the clamping block 194. The clamping block 194 is formed with a transverse groove 232 which is designed to accommodate a downturned edge of a supermarket shelf.

Figure 12:
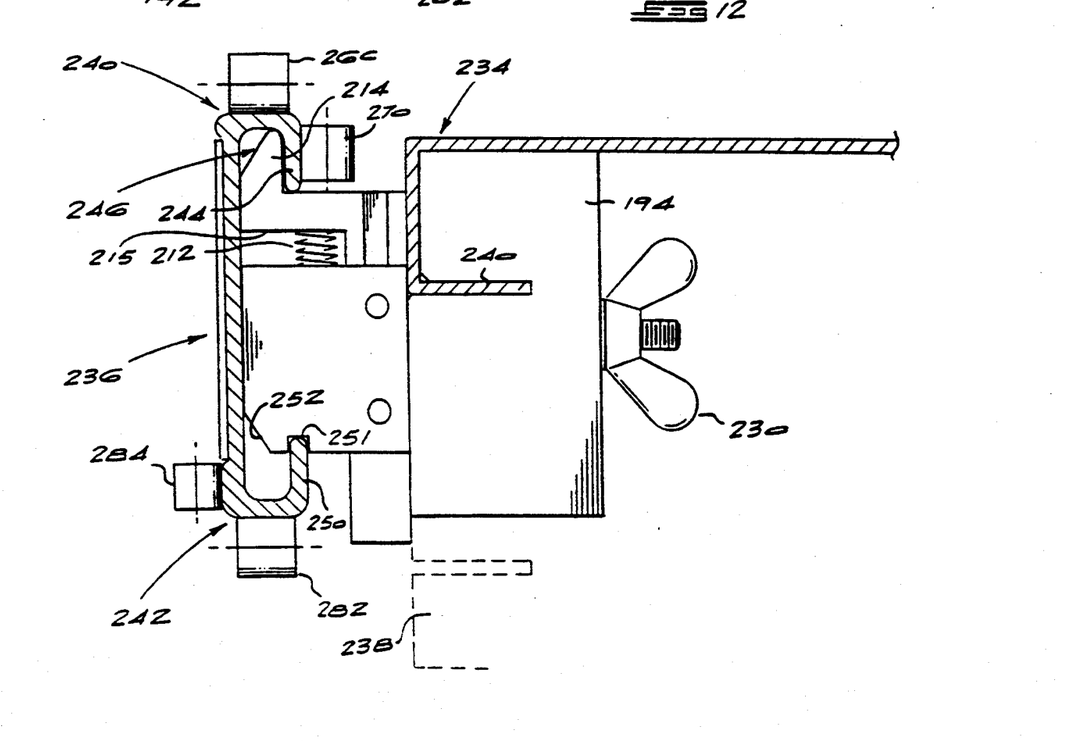
FIG. 12 shows an assembled side view of the clip arrangement of FIG. 11.

Turning now to FIG. 12, a side assembled view of the clip assembly 188 is shown connecting a shelf edge 234 detachably to a printing track 236. In order to mount the printing track 236 onto the shelf edge 234, the butterfly nut 230 is loosened, the clamping block 194 is rotated 180° on the bolt 220 and is slid downwards to a position indicated in broken outline at 238, thereby allowing access for a re-entrant portion 240 of the shelf edge to be slid into position in the groove 232. The upper and lower jaws 190 and 192 are then twisted through 180° on the bolt 220 to the position indicated in FIG. 12, and the butterfly nut is partly tightened so as to retain the clip assembly loosely in position on the shelf edge 234.

Once a number of clip assemblies have been installed at intervals along the shelf edge 234 in the manner described, the printing track 236 is clipped into position. The printing track 236 has upper and lower U-shaped rails 240 and 242. The upper rail 240 terminates in a re-entrant flange 244 defining a bight 246 for locating the upper foot 214. The lower rail 242 similarly terminates in a re-entrant flange 250, the rounded end 251 of which locates within the slot 216. The printing track 236 is clipped on by initially suspending the upper rail on the foot 214 and subsequently pushing the rounded end 251 of the lower rail into position, with the end 251 interacting with a chamfered face 252 of the lower jaw 192 so as to push the jaw 192 upwards against the action of the coil spring 212 until the rounded end locates within the groove 216 in a snap fit. The individual height of each clip assembly relative to the shelf edge 234 is adjusted by loosening the butterfly nut 230, sliding the upstanding portion 198 of the jaw up or down until it is supporting the printing track at the correct height, and subsequently tightening up the nut 230 so as to clamp the jaw firmly in position against the clamping block 194.

Figure 14:
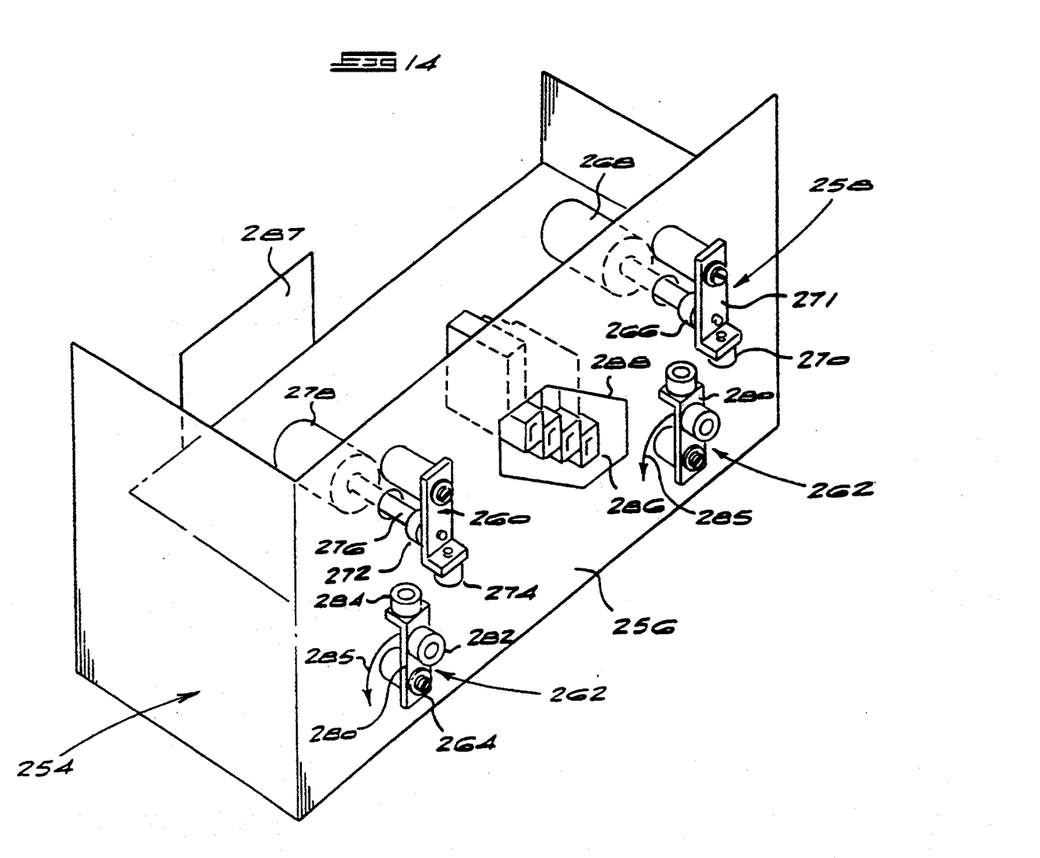
FIG. 14 shows a perspective rear view of a further embodiment of a carriage forming part of the printing apparatus of the invention.

Referring now to FIG. 14, a partly schematic view of a carriage 254 is shown having an inner wall 256 to which upper driven and idler roller assemblies 258 and 260 and lower roller assemblies 262 are mounted by means of screws 264. The upper driven roller assembly 258 includes a driven roller 266 carried on the shaft of a motor 268 and a vertically mounted retaining roller 270 carried on an L-shaped bracket 271. The idler roller assembly 260 similarly includes an L-shaped bracket 271 carrying horizontally and vertically mounted rollers 272 and 274. The roller 272 is supported on a shaft 276 which extends into an optical position encoder 278 for monitoring movement of the carriage.

Each lower roller assembly 262 comprises an L-shaped bracket 280 carrying horizontally and vertically aligned rollers 282 and 284. The manner in which the rollers interact with the printing track 236 is clearly illustrated in FIG. 12, with the weight of the carriage pushing the roller 284 into contact against the front surface of the rail 242. The lower roller assemblies 262 are mounted pivotably on the screws 264 and are spring loaded in such a way that they may be temporarily rotated out of position in the direction of arrows 285 for enabling the carriage to be fitted onto the printing track. Four printing heads 286 extend through an opening 288 in the rear wall 256 of the printer. The printing heads 286 are Hewlett Packard ® HP41640A printing heads which are mounted in a staggered relationship so as to cover the full width of the printing surface. For purposes of clarity, none of the circuit boards and other electronic componentry have been illustrated in the carriage of FIG. 14. The carriage includes a front wall panel 287 carrying a user interface of the type illustrated in FIG. 8.

In a relatively simple version of the printing apparatus, suitable markings such as bar codes may be located at intervals along the printing track. These bar codes may be representative of the particular stock item stored on the shelf just downstream of the bar codes. A bar code reader of the type described is incorporated on each printer, and as the printer is pushed or driven along the track, the bar code reader then feeds the product information to the central processing unit 102, which in turn extracts the relevant data from memory, including the relevant icon, the relative font size and the pricing information in respect of that particular product. This is then downloaded and printed onto the printing track just downstream of the bar code.

Consequently, no accurate position monitoring equipment needs to be employed, as the information printed on the printing surface is entirely dependent on the bar codes which have just been scanned. If the price of only one item has changed, and that item is located midway along a forty meter shelf, the relevant length of printing surface is erased and the printing carriage is manually scanned along only that portion of the shelf which requires repricing, with the bar code identifying either the shelf or product type and thereby causing the correct labelling to be downloaded and printed onto the shelf.

One disadvantage of a low cost RS232 link is that, in the case of a relatively long cable between the central computer and the printer, the data transfer rate is relatively slow. Consequently, the information which is sent via the RS232 cable is generally limited to a description of the current shelf being printed. Typically, this amounts to approximately ten thousand characters, incorporating information such as the position of the icons or images on the shelf and the price information for each product.

In an alternative embodiment, a high speed communications link in the form of a high speed digital radio link is employed between the central computer and the printer. The central computer is connected to a transceiver with an antenna mounted centrally in the roof of the store. The printer similarly has a small transceiver and an integral antenna mounted on it. An advantage of the high speed radio link is that the printer does not require a large memory to store the icons and images, as these can be transferred on-line over the radio link while the printer is printing. As a result, the printer is smaller and lighter. Furthermore, no lengthy data transfer cable is required. The power cable may still be needed, although a suitable on-board battery pack could be provided to power the printer motor and its control circuitry as it is travelling along the shelf.

It is envisaged that the printing apparatus of the invention will considerably speed up the pricing of stock items in supermarkets, and will also ensure that there is no disparity between the shelf and the till prices.

We claim:

1. A printing apparatus comprising an elongate printing track including a print receiving surface being integral with and fixed relative to the printing track, guide means extending alongside the print receiving surface, a printing carriage arranged to travel along the printing track on the guide means, monitoring means for monitoring the movement of the carriage as it travels along the printing track, and control means responsive to the monitoring means for controlling the operation of the carriage, the carriage including at least one printing head arranged to receive data for printing directly on the print receiving surface at predetermined positions along the printing track, wherein the elongate printing track is arranged to be mounted on a shelf and the printing carriage is arranged to print data on said print receiving surface corresponding to a shelf item location.

2. A printing apparatus according to claim 1 which includes a central database remote from the carriage, the carriage includes memory means, and data transmission means are provided for allowing data to be downloaded from the central database to the memory means on the carriage, the central database including both positional data for controlling the position of the printing head on the printing track and labeling data for printing labelling on the print receiving surface of the printing track.

3. A printing apparatus according to claim 1 wherein the printing track is integrally mounted on said shelf, towards an overhanging edge thereof.

4. A printing apparatus according to claim 1 which includes a fixed feed track arranged to provide mounting means for the carriage prior to printing on the printing track, the printing track being arranged to be mounted detachably adjacent and in axial alignment with the fixed feed track.

5. A printing apparatus according to claim 1 in which the carriage includes drive means arranged to co-operate with the guide means for driving the carriage along the printing track.

6. A printing apparatus according to claim 1 in which the carriage is arranged to be manually scanned along the printing track.

7. A printing apparatus according to claim 1 in which the monitoring means is synchronized with the control means for controlling the operation of the printing head, the monitoring means being arranged to provide timing signals based on the movement of the printing head on the print receiving surface.

8. A printing apparatus according to claim 1 in which the monitoring means includes identification means located on the printing track, and a reader provided on the carriage for reading the identification means, the reader being arranged to interact with the identification means to control the downloading of data onto the printing track at predetermined positions on the track.

9. A printing apparatus according to claim 1 in which the guide means includes at least one rail formation, and the carriage includes at least one roller arrangement for co-operating with the rail formation for travelling along the printing track.

10. A printing apparatus according to claim 9 in which the guide means includes a pair of opposed rail formations flanking the print receiving surface, and the roller arrangement includes at least one pair of rollers arranged to travel along and to be held in captive engagement with the rail formations.

11. A printing apparatus according to claim 1 in which the control means includes a central processing unit, static memory means for storing relatively static data, and volatile memory means for storing relatively dynamic data.

12. A printing apparatus according to claim 11 in which the static data includes icon-related data providing icons or images of stock, and/or font-related data, and/or translation data.

13. A printing apparatus according to claim 2 in which the dynamic data comprises shelf description data including positional data for controlling the position of stock labels and pricing data reflecting updated prices of stock.

14. A printing apparatus according to claim 1 in which the monitoring means includes an optical position encoder arranged to be coupled to a roller arrangement carried on the carriage, logic circuitry responsive to the optical position encoder, and a printer driver controlled by the logic circuitry, the printer driver being arranged to drive the printing head.

15. A printing apparatus according to claim 2 in which the central database includes identification data for identifying which printing track on a particular shelf or gondola requires printing.

16. A printing apparatus according to claim 8 in which the identification means is located on at least one end of the printing track, the identification means being arranged to identify a particular printing track to ensure that the correct data is printed on the track.

17. An elongate printing track assembly comprising a print receiving surface being integral with and fixed relative to a printing track, guide means extending alongside the print receiving surface for accommodating a printing carriage, the printing surface being arranged to receive print directly from a printing head extending from the carriage, and being formed from a material upon which a printing ink is receivable, curable and erasable, and the printing track assembly being arranged to be mounted on a shelf.

18. A printing track assembly according to claim 17 in which the guide means comprises a pair of opposed rail formations flanking the print receiving surface, which is located between the rail formations.

19. A printing track assembly according to claim 17 wherein the printing track assembly is mounted integrally on the said shelf.

20. A printing track assembly according to claim 17 which includes a plurality of clips for mounting the printing track detachably to the shelf edge, and complemental clip-engaging formations carried on the printing track, each clip comprising a clamping bracket for clamping the clip detachably to a shelf edge, and a pair of jaws extending from the clamping bracket and arranged to engage the clip-engaging formations in a snap fit.

21. A printing track assembly according to claim 20 in which each clip comprises height adjustment means for adjusting the height of the printing track relative to the shelf edge.

22. A printing track assembly according to claim 17 in which the material from which the printing surface is formed is chosen from a group including Melamine ®, PVC or an acrylic plastics material.

23. A printing track assembly according to claim 17 in which the printing ink is chosen from a group including water- or solvent-based resin bonding agents.

24. A printing carriage arranged to travel along a plurality of separate elongate printing tracks, each printing track being mounted on a shelf and defining a print receiving surface integral with and fixed relative to the track, the carriage including roller means for monitoring movement of the carriage as it travels along the printing track, control means responsive to the monitoring means for controlling the operation of the carriage, memory means and at least one printing head arranged to receive data at the memory means via data transmission means for printing directly on the printing surface at predetermined positions along the printing track.

25. A printing carriage according to claim 24 which includes drive means for driving the carriage along the printing track via interaction of the roller means and the guide means.

26. A shelf labelling system for identifying and pricing items of stock on shelves, the labelling system comprising a plurality of printing tracks extending along the lengths of the shelves and including print receiving surfaces on each track, at least one printing carriage being arranged to travel along the printing tracks and having a printing head, a central database, and data transmission means for allowing the central database to download at least stock pricing data to the carriage, the printing head being arranged to receive the data for printing on the print receiving surfaces at predetermined positions along the printing tracks.

27. A method of labeling a row of items comprising the steps of:
a) providing labeling data relating to the items;
b) locating a printing carriage at a predetermined position on a first continuous printing track extending alongside a first row of items;
c) transferring the data to the printing carriage; and
d) printing the data on a printing surface of the printing track at positions corresponding to a location for said items in said row as the printing carriage moves along the printing track.

28. A method according to claim 27 which includes the initial steps of entering, at a remote database, updated data relating to the items, and transferring the updated data to the printing carriage.

29. A method according to claim 27 which includes the steps of removing the printing carriage from the first printing track, locating the printing carriage on a second printing track extending alongside a second row of items, and repeating steps c) and d) of claim 27.

30. A method according to claim 27 which includes the steps of identifying the row of items to be labelled, and confirming that the labelling data corresponds to that row.

* * * * *